(12) United States Patent
Brettschneider et al.

(10) Patent No.: US 10,474,150 B2
(45) Date of Patent: Nov. 12, 2019

(54) METHOD FOR AUTOMATIC MOVEMENT CONTROLLING OF A VEHICLE

(71) Applicant: Robert Bosch GmbH, Stuttgart (DE)

(72) Inventors: Thomas Brettschneider, Leonberg (DE); Charlotte Grinenval, Markgroeningen (DE); Nils Hagenlocher, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 36 days.

(21) Appl. No.: 15/925,979

(22) Filed: Mar. 20, 2018

(65) Prior Publication Data

US 2018/0284775 A1 Oct. 4, 2018

(30) Foreign Application Priority Data

Mar. 31, 2017 (DE) .................. 10 2017 205 508

(51) Int. Cl.
| | |
|---|---|
| *G05D 1/00* | (2006.01) |
| *G05D 1/02* | (2006.01) |
| *B60W 10/18* | (2012.01) |
| *B60W 10/20* | (2006.01) |
| *B60W 30/02* | (2012.01) |
| *B60W 30/12* | (2006.01) |
| *G06F 17/50* | (2006.01) |
| *B60W 10/06* | (2006.01) |
| *B60W 10/08* | (2006.01) |

(52) U.S. Cl.
CPC ........... *G05D 1/0088* (2013.01); *B60W 10/06* (2013.01); *B60W 10/08* (2013.01); *B60W 10/18* (2013.01); *B60W 10/20* (2013.01); *B60W 30/025* (2013.01); *B60W 30/12* (2013.01); *G05D 1/0212* (2013.01); *G05D 1/0214* (2013.01); *G06F 17/5009* (2013.01); *B60W 2710/06* (2013.01); *B60W 2710/08* (2013.01); *B60W 2710/18* (2013.01); *B60W 2710/20* (2013.01); *G05D 2201/0213* (2013.01); *G06F 2217/16* (2013.01)

(58) Field of Classification Search
CPC .. G05D 1/0088; G05D 1/0214; G05D 1/0212; G05D 2201/0213; B60W 10/18; B60W 10/20; B60W 30/025; B60W 30/12; B60W 10/06; B60W 10/08; B60W 2710/08; B60W 2710/06; B60W 2710/18; B60W 2710/20; G06F 17/5009; G06F 2217/16

See application file for complete search history.

(56) References Cited

U.S. PATENT DOCUMENTS

| | | | |
|---|---|---|---|
| 8,706,460 B2 * | 4/2014 | Falangas ............. | G06F 17/5095 701/4 |
| 2002/0138192 A1* | 9/2002 | Lueder ............... | B60K 31/0008 701/93 |
| 2003/0070851 A1* | 4/2003 | Winner .............. | B60K 31/0008 180/167 |

(Continued)

*Primary Examiner* — Frederick M Brushaber
(74) *Attorney, Agent, or Firm* — Norton Rose Fulbright US LLP; Gerard Messina

(57) ABSTRACT

In a method for automatic movement controlling of a vehicle, at least one trajectory is determined on the basis of environmental and driving state data, and driving state quantities are subsequently calculated for an upcoming time period, using a mathematical vehicle model, taking the trajectory as a basis.

13 Claims, 1 Drawing Sheet

(56) References Cited

U.S. PATENT DOCUMENTS

| | | | |
|---|---|---|---|
| 2015/0158487 A1* | 6/2015 | Siedersberger | B60W 30/02 701/1 |
| 2015/0203215 A1* | 7/2015 | Falangas | B64F 5/00 703/2 |
| 2017/0015288 A1* | 1/2017 | Coelingh | G05D 1/0088 |
| 2017/0168485 A1* | 6/2017 | Berntorp | B60W 30/00 |
| 2017/0247032 A1* | 8/2017 | Lee | B60W 30/12 |
| 2018/0017971 A1* | 1/2018 | Di Cairano | G05D 1/0088 |
| 2018/0074505 A1* | 3/2018 | Lv | B60W 30/12 |
| 2019/0106118 A1* | 4/2019 | Asakura | G08G 1/00 |

\* cited by examiner

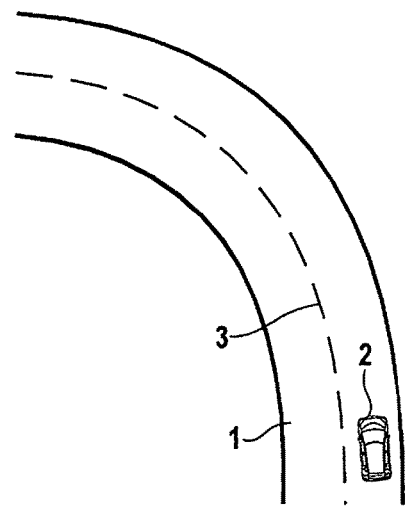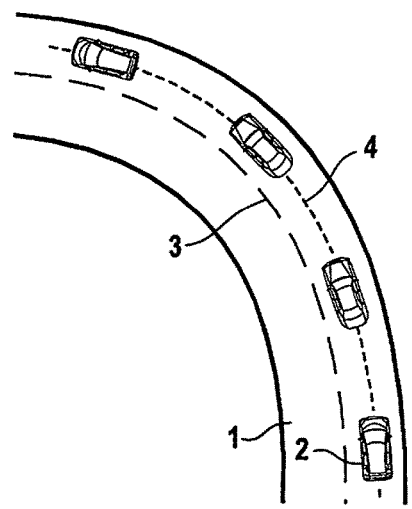
Fig. 1     Fig. 2
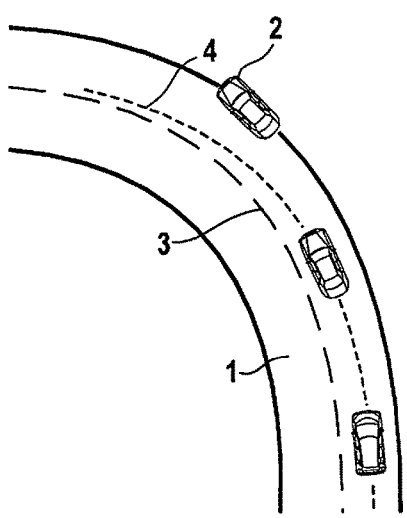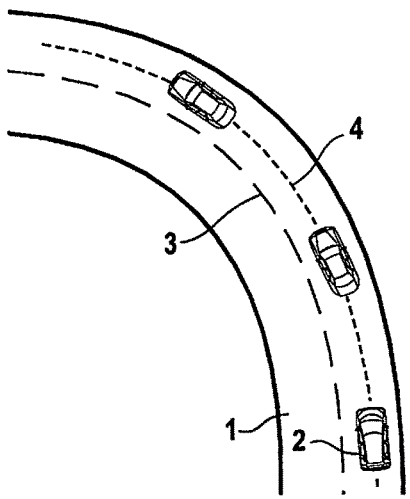
Fig. 3     Fig. 4

METHOD FOR AUTOMATIC MOVEMENT CONTROLLING OF A VEHICLE

CROSS REFERENCE

The present application claims the benefit under 35 U.S.C. § 119 of German Patent Application No. DE 102017205508.1 filed on Mar. 31, 2017, which is expressly incorporated herein by reference in its entirety.

FIELD

The present invention relates to a method for automatic movement controlling of a vehicle, in which a trajectory is determined on the basis of environmental and driving state data.

BACKGROUND INFORMATION

Conventionally, a vehicle-internal sensor system may be used to ascertain driving state quantities for longitudinal and transverse dynamic behavior, such as vehicle speed and acceleration quantities, and to determine the current position of the vehicle on the roadway using an environmental sensor system and/or a navigation system. On this basis, a trajectory can be calculated along which the vehicle is to move on the roadway, and actuators in the vehicle can be controlled, in particular the engine, a steering actuator system, and a brake actuator system, so that the vehicle automatically moves along the trajectory. The trajectory has to satisfy defined conditions; for example, there must be no collisions with geometrical boundaries, and safety and comfort considerations have to be taken into account with regard to acceleration in the vehicle.

SUMMARY

An example method according to the present invention can be used for the automatic movement controlling of a vehicle, in which, on the basis of environmental and driving state data, one or more trajectories (movement paths) are determined along which the vehicle is to move automatically through the controlling of one or more actuators in the vehicle.

The automatic movement controlling includes both completely automated driving of the vehicle without any driver intervention and also partly automated driving in which at least one control function is taken over by an actuator and at least one control function is taken over by the driver; for example, the vehicle speed can be set in automated fashion and the steering movement can be taken over by the driver.

In the example method, first, in a first step a trajectory is determined along which the vehicle is intended to move along a defined path segment. The trajectory defines the movement path on the roadway; in addition, the trajectory can also contain additional information, in particular concerning kinematic driving state quantities such as speed, acceleration, or jerk. The trajectory is determined on the basis of environmental and driving state quantities that are known at the moment of the determination of trajectories, or in a defined time period before the determination of trajectories.

The environmental data originate, for example, from a navigation system including a vehicle position determining system, and/or from an environmental sensor system in the vehicle, for example a camera system, a lidar system, an ultrasound system, or a radar system. The driving state data are ascertained in a vehicle-internal sensor system, and include in particular kinematic quantities relating to position, speed, and/or acceleration in the vehicle longitudinal direction, vehicle transverse direction, and/or vehicle vertical direction.

Following the determination of the trajectory, in a following second step driving state quantities are calculated that result from a mathematical vehicle model, taking the previously determined trajectory as a basis. For this purpose, in the mathematical vehicle model the movement of the vehicle along the trajectory is simulated, and driving state quantities are calculated during the movement of the vehicle along the trajectory. The simulation takes place predictively for an upcoming time period, or, corresponding to the upcoming time period, for various positions of the vehicle along the trajectory before it is traveled by the vehicle.

From the calculated driving state quantities in the upcoming time period, an evaluation criterion for the trajectory is ascertained on the basis of a defined calculating rule. The evaluation criterion may lead to an acceptance of the trajectory, so that this trajectory can be used to set one or more actuators in the vehicle, and a partly or fully automatic moving vehicle can be realized along the trajectory.

The evaluation criterion may lead to a rejection or a modification of the trajectory. In this case the original trajectory cannot be realized, for reasons of, for example, safety or comfort, so that the vehicle changes to an alternative or modified trajectory in order to satisfy defined criteria, in particular relating to safety or comfort.

The example method may have the advantage that temporally before the actual traveling of the trajectory, the effects on the vehicle can be ascertained using the mathematical vehicle model. The method thus looks into the future and calculates the effects on the vehicle during the traveling of the trajectory. This makes it possible to predict even driving states that are complex and critical for driving dynamics, and if necessary to take corrective measures, for example if pulling or acceleration of the vehicle is determined in the traveling of the trajectory. As a corrective measure, either the trajectory is modified and the vehicle moves to an alternative trajectory, or some other measure is taken, in particular acting on a driving state quantity before the occurrence of a safety-critical or comfort-critical state, for example through braking of the vehicle ahead of time or through an intervention in the steering system.

In addition to the spatial movement path of the vehicle on the roadway, the trajectory can also include associated driving state quantities for longitudinal, transverse, and/or vertical dynamic behavior. To this extent, an intervention in a trajectory includes both a change in the movement path and a driving state quantity of the vehicle, such as the vehicle speed or the steering angle.

The evaluation criterion for the trajectory can be ascertained both with regard to safety and with regard to comfort. With regard to safety, it has to be ensured that the vehicle travels stably and controllably, in particular taking into account current environmental conditions such as the condition of the roadway surface. With regard to comfort, it can be useful for example to avoid swaying rolling movements of the vehicle by carrying out an intervention in the chassis using a chassis actuator.

In addition, it is possible to define different parameterizations for different kinds of driving, for example for a comfort-oriented or sport-oriented driving mode. For example, spring/damper rates in the vehicle can be correspondingly adapted.

Stabilization or safety aspects can be assigned both to the area of active safety and the area of passive safety. Stabilization aspects in the area of active safety relate to vehicle units having an actuator via which it is possible to intervene immediately in the driving state of the vehicle. In the area of passive safety, measures can for example be taken in the vehicle to improve safety before the occurrence of a safety-critical situation; for example, belt tighteners can be actuated, airbags triggered, windows closed, or brake pads can be brought closer to the brake disc. In this way, for example consequences of accidents can be reduced.

Advantageously, the determination of the at least one trajectory, and the following testing using the mathematical vehicle model, takes place continuously, in particular in discrete time intervals. This makes it possible to carry out corrections for each recalculation of the trajectory and testing or simulation in the vehicle model. It may be useful to determine the length of the trajectory as a function of the current course of the roadway, for example to completely ascertain the path through an upcoming curve and subsequently to simulate, in the mathematical vehicle model, the driving state quantities that result when the trajectory is traveled.

If warranted, the trajectory can be subdivided into partial segments for each of which a simulation is carried out using the mathematical vehicle model.

The mathematical vehicle model is set up, for example, using the method of multi-body systems.

The driving state quantities simulated in the mathematical vehicle model are used as the basis of a defined calculating rule for the evaluation criterion for the trajectory. In addition, it may also be possible for the calculated driving state quantities for the upcoming time period for which these driving state quantities were calculated to be provided to one or more vehicle units in the vehicle, for example to be stored for documentation purposes.

In an advantageous embodiment, the vehicle unit includes one or more actuators that influence the driving state and that are controlled on the basis of the calculated driving state quantities in such a way that the vehicle follows the desired trajectory. In addition or alternatively to the driving state quantities, it is also possible to provide the trajectory immediately to the vehicle unit, for example in order to generate control signals for the respective actuator directly from the trajectory.

The vehicle unit is for example the brake system, the steering system, and/or the drive unit of the vehicle, in particular an internal combustion engine and/or an electric motor. The brake system is preferably a hydraulically acting or electromechanical unit. In the case of the steering system, the actuator is preferably an electromechanical unit, for example an electric motor.

The various method steps are carried out in a control device to which the environmental and driving state data are also supplied, in particular from sensor signals or the navigation device in the vehicle. In the control device, it is possible both to determine the trajectories and to carry out simulations on the basis of the mathematical vehicle model. Actuating signals for controlling the actuators are either also generated in the control device or in a further control device that is assigned immediately to the actuator, or to the relevant vehicle unit.

The control device can be a component of a driver assistance system, for example an assistance system suitable for carrying out an automatic driving process for influencing the steering system, the brake system, and/or the drive unit.

Further advantages and useful embodiments are described herein and shown in the figures.

BRIEF DESCRIPTION OF THE DRAWINGS

FIG. 1 shows, in a top view, a vehicle on a roadway that describes a curve.

FIG. 2 shows the vehicle in various positions along a trajectory through the curve;

FIG. 3 shows a representation corresponding to FIG. 2, but with a modified trajectory that the vehicle departs from;

FIG. 4 shows a further representation having a modified trajectory that the vehicle follows.

DETAILED DESCRIPTION OF EXAMPLE EMBODIMENTS

In the Figures, identical parts are provided with identical reference characters.

FIG. 1 shows a roadway 1 that describes a curve; a vehicle 2 is shown at the beginning of the curve. Vehicle 2 is situated on the right side of roadway 1, which is divided by center line 3. FIG. 1 shows an initial situation of vehicle 2 at the beginning of the curve at time to. For an automated driving function, in a control device of vehicle 2, starting from the current driving state and the course of the roadway, which is acquired using an environmental sensor system and/or a navigation system including a position determination system in the vehicle, a trajectory is ascertained along which vehicle 2 is to travel through the curve of roadway 1, in partly or completely automatic fashion.

Trajectory 4 is shown in FIG. 2. In FIG. 2, vehicle 2 is shown at various time intervals $\Delta t$, and is correspondingly shown at various positions on trajectory 4. Trajectory 4 extends on the right side of the roadway at least approximately centrically between center line 3 and the right edge of roadway 1. Trajectory 3 includes the movement path for vehicle 2 through the curve of roadway 1, but in addition the trajectory can also contain information concerning speed, acceleration, and, if warranted, the jerk in the vehicle longitudinal direction, vehicle transverse direction, and/or vehicle vertical direction.

Trajectory 4 is determined in the control device in the vehicle, and driving state quantities that result during travel of the vehicle model along trajectory 4 are subsequently calculated for the upcoming time period, using a mathematical vehicle model also stored in the control device. In this way, the travel of the vehicle along trajectory 4 is predictively simulated in the vehicle model, and from this there result driving state quantities at various times of vehicle 2 along trajectory 4, or at various positions of trajectory 4.

These driving state quantities calculated ahead of time can be used as the basis for determining an evaluation criterion with which trajectory 4 is evaluated. On the basis of the evaluation criterion, it can be decided whether the trajectory can be traveled, with regard to various considerations such as vehicle safety or driving comfort, or whether the trajectory has to be modified or a changeover has to be made to an alternative trajectory.

FIG. 3 shows the situation in which vehicle 2, due to its speed and/or external circumstances, such as a reduced friction value, cannot completely follow trajectory 4 through the curve. Approximately in the center of the curve, vehicle 2 departs from the trajectory and moves radially outward, in the direction towards the outer edge of the roadway. This driving behavior of vehicle 2 can be simulated ahead of time in the mathematical vehicle model, whereupon the trajectory according to FIG. 3 is rejected, and instead a changeover is made to a modified or alternative trajectory according to FIG. 4.

The trajectory according to FIG. 4 is a modification of the trajectory of FIG. 3, and is realized such that vehicle 2 can follow trajectory 4 over the entire course of the curve under the given circumstances, or given the current or predicted vehicle speed. FIG. 4 is also a simulation made ahead of time. Correspondingly, before reaching a critical point on the trajectory a modified trajectory along which the vehicle is actually moving can still be taken as a basis. For partly automatic or fully automatic driving through the curve along trajectory 4, actuators in various vehicle units are correspondingly controlled, in particular in the brake system, in the steering system, and in the drive unit.

During the actual traveling through the curve along trajectory 4, tests can be continuously carried out at time-discrete intervals. Here, starting from the current driving state and the current position of the vehicle, a new trajectory is continuously determined that, immediately subsequently, is used as a basis for a simulation in the mathematical vehicle model, from which, as described above, driving state quantities are determined and an evaluation criterion for the newly calculated trajectory is ascertained. If the evaluation criterion is within a defined specification, then the newly calculated trajectory, which may also agree with the previously calculated trajectory, can continue to be used. If, in contrast, the evaluation criterion is outside defined limits, the newly calculated trajectory must be modified or rejected, as described above. Only if the trajectory in the simulation results in acceptable driving state quantities can the newly calculated trajectory be used as a basis for the controlling of the actuators in the vehicle.

What is claimed is:

1. A method for the automatic movement controlling of a vehicle, comprising:
   performing, during actual driving of the vehicle, the following steps (a) through (f):
   (a) obtaining, from a navigation system of the vehicle and/or an environmental sensor system of the vehicle, environmental data of the vehicle;
   (b) obtaining, from a vehicle-internal sensor system of the vehicle, driving state data, the driving state data being kinematic quantities relating to a detected current position of the vehicle and/or a detected current speed of the vehicle and/or a detected current acceleration of the vehicle;
   (c) determining at least one trajectory based on the environmental data and the driving state data;
   (d) after the determining, calculating driving state quantities for an upcoming time period using a mathematical vehicle model, taking the determined trajectory as a basis;
   (e) evaluating the determined trajectory based on the calculated driving state quantities of the upcoming time period; and
   (f) based on the evaluating, controlling at least one vehicle component of the vehicle based on: (i) the calculated driving state quantities of the upcoming time period and/or (ii) a modified trajectory;
   wherein the vehicle component of the vehicle includes at least one actuator that influences a driving state of the vehicle.

2. The method as recited in claim 1, wherein based on the environmental data and the driving state data, a plurality of trajectories are determined, and one of the plurality of trajectories is subsequently selected using the mathematical vehicle model.

3. The method as recited in claim 1, wherein the modified trajectory is ascertained using the mathematical vehicle model, and in step (f), the vehicle component is controlled based on the modified trajectory ascertained using the mathematical vehicle model.

4. The method as recited in claim 1, wherein based on (i) the calculated driving state quantities of the upcoming time period and/or (ii) the modified trajectory, the actuator influences a longitudinal behavior of the vehicle, and/or a transverse behavior of the vehicle, and/or a vertical dynamic behavior of the vehicle.

5. The method as recited in claim 1, wherein at least one trajectory is determined continuously on the basis of environmental data and driving state data, and driving state quantities are subsequently calculated for an upcoming time period, using the mathematical vehicle model, taking the trajectory as a basis.

6. The method as recited in claim 1, wherein the mathematical vehicle model simulates movement of the vehicle along the determined trajectory to calculate the driving state quantities for the upcoming time period.

7. The method as recited in claim 1, wherein the at least one actuator includes: (i) an actuator in a brake system of the vehicle, and/or (ii) an actuator in a steering system of the vehicle, and/or (iii) an actuator in a drive component of the vehicle.

8. The method as recited in claim 1, wherein steps (a) through (e) are continuously performed at time-discrete intervals during the actual driving of the vehicle.

9. A control device for automatic movement controlling of a vehicle, the control device configured to:
   perform, during actual driving of the vehicle, the following (a) through (f):
   (a) obtain, from a navigation system of the vehicle and/or an environmental system of the vehicle, environmental data of the vehicle;
   (b) obtain, from a vehicle-internal sensor system of the vehicle, driving state data, the driving state data being kinematic quantities relating to a detected current position of the vehicle and/or a detected current speed of the vehicle and/or a detected current acceleration of the vehicle;
   (c) determine at least one trajectory based on the environmental data and the driving state data;
   (d) after the determination, calculate driving state quantities for an upcoming time period using a mathematical vehicle model, taking the determined trajectory as a basis;
   (e) evaluate the determined trajectory based on the calculated driving state quantities of the upcoming time period; and
   (f) based on the evaluation, control at least one vehicle component of the vehicle based on: (i) the calculated driving state quantities of the upcoming time period and/or (ii) a modified trajectory;
   wherein the vehicle component of the vehicle includes at least one actuator that influences a driving state of the vehicle.

10. The control device as recited in claim 9, wherein the at least one actuator includes: (i) an actuator in a brake system of the vehicle, and/or (ii) an actuator in a steering system of the vehicle, and/or (iii) an actuator in a drive component of the vehicle.

11. The control as recited in claim 9, wherein the control device is configured to perform (a) through (e) at time-discrete intervals during the actual driving of the vehicle.

12. A driver assistance system in a vehicle, comprising:
a control device for automatic movement controlling of a vehicle, the control device configured to perform, during actual driving of the vehicle, the following (a) through (f): (a) obtain, from a navigation system of the vehicle and/or an environmental system of the vehicle, environmental data of the vehicle, (b) obtain, from a vehicle-internal sensor system of the vehicle, driving state data, the driving state data being kinematic quantities relating to a detected current position of the vehicle and/or a detected current speed of the vehicle and/or a detected current acceleration of the vehicle, (c) determine at least one trajectory based on the environmental data and the driving state data, (d) after the determination, calculate driving state quantities for an upcoming time period using a mathematical vehicle model, taking the determined trajectory as a basis, (e) evaluate the determined trajectory based on the calculated driving state quantities of the upcoming time period, and (f) based on the evaluation, control at least on vehicle component of the vehicle based on: (i) the calculated driving state quantities of the upcoming time period and/or (ii) a modified trajectory;
wherein the vehicle component of the vehicle includes at least one actuator that influences a driving state of the vehicle.

13. A vehicle having a driver assistance system, the driver assistance system comprising:
a control device for automatic movement controlling of a vehicle, the control device configured to perform, during actual driving of the vehicle, the following (a) through (f): (a) obtain, from a navigation system of the vehicle and/or an environmental system of the vehicle, environmental data of the vehicle, (b) obtain, from a vehicle-internal sensor system of the vehicle, driving state data, the driving state data being kinematic quantities relating to a detected current position of the vehicle and/or a detected current speed of the vehicle and/or a detected current acceleration of the vehicle, (c) determine at least one trajectory based on the environmental data and the driving state data, (d) after the determination, calculate driving state quantities for an upcoming time period using a mathematical vehicle model, taking the determined trajectory as a basis, (e) evaluate the determined trajectory based on the calculated driving state quantities of the upcoming time period, and (f) based on the evaluation, control at least on vehicle component of the vehicle based on: (i) the calculated driving state quantities of the upcoming time period and/or (ii) a modified trajectory, wherein the vehicle component of the vehicle includes at least one actuator that influences a driving state of the vehicle.

* * * * *